United States Patent [19]

Schütten et al.

[11] Patent Number: 5,018,826

[45] Date of Patent: May 28, 1991

[54] ROLL MANUFACTURED WITH A LIGHT WAVEGUIDE CONDUCTOR

[75] Inventors: Dagmar Schütten, Erfstadt; Hans-Joachim Schmitz, Kerpen; Hans-Peter Caspar, Troisdorf; Veit M. Kolschbach, Cologne; Gerald Znoyek, Leverkusen; Norbert Wenzel, Bergisch-Gladbach, all of Fed. Rep. of Germany

[73] Assignee: U.S. Philips Corp., New York, N.Y.

[21] Appl. No.: 354,009

[22] Filed: May 19, 1989

[30] Foreign Application Priority Data

May 19, 1988 [DE] Fed. Rep. of Germany ....... 3817030
Dec. 14, 1988 [DE] Fed. Rep. of Germany ....... 3842036

[51] Int. Cl.$^5$ .................................................. G02B 6/16
[52] U.S. Cl. ................................ 350/96.29; 242/18 G; 242/159; 244/3.12; 244/3.16; 350/96.23
[58] Field of Search ............................ 244/3.12, 3.16; 350/96.23, 96.29; 242/159, 18 G, 54 R

[56] References Cited

U.S. PATENT DOCUMENTS

| | | | |
|---|---|---|---|
| 3,156,185 | 11/1964 | Hermann et al. | 244/3.12 X |
| 3,750,058 | 7/1973 | Bankert, Jr. et al. | 350/96.23 X |
| 3,785,137 | 1/1974 | Karlson | 242/159 X |
| 3,845,912 | 11/1974 | Eichmanns et al. | 242/18 R |
| 3,887,265 | 6/1975 | Margolis et al. | 350/96.23 |
| 4,076,382 | 2/1978 | Oestreich | 350/96.23 |
| 4,185,796 | 1/1980 | Riley | 244/3.12 |
| 4,230,395 | 10/1980 | Dean et al. | 350/96.23 |
| 4,318,588 | 3/1982 | Zeidler et al. | 350/96.23 |
| 4,883,337 | 11/1989 | Dahlgren | 350/96.29 |

FOREIGN PATENT DOCUMENTS 2012293 9/1971 Fed. Rep. of Germany.

*Primary Examiner*—John D. Lee
*Attorney, Agent, or Firm*—William J. Botjer

[57] ABSTRACT

The invention relates to a roll manufactured with a light waveguide conductor (LWG-conductor), in particular for the transmission of optical signals from and to, respectively, a moving body. A perfect winding construction from which the conductor can be unreeled without interference is obtained in that the LWG-conductor (1) is wound to form a self-supporting cross-roll without a winding core.

14 Claims, 1 Drawing Sheet

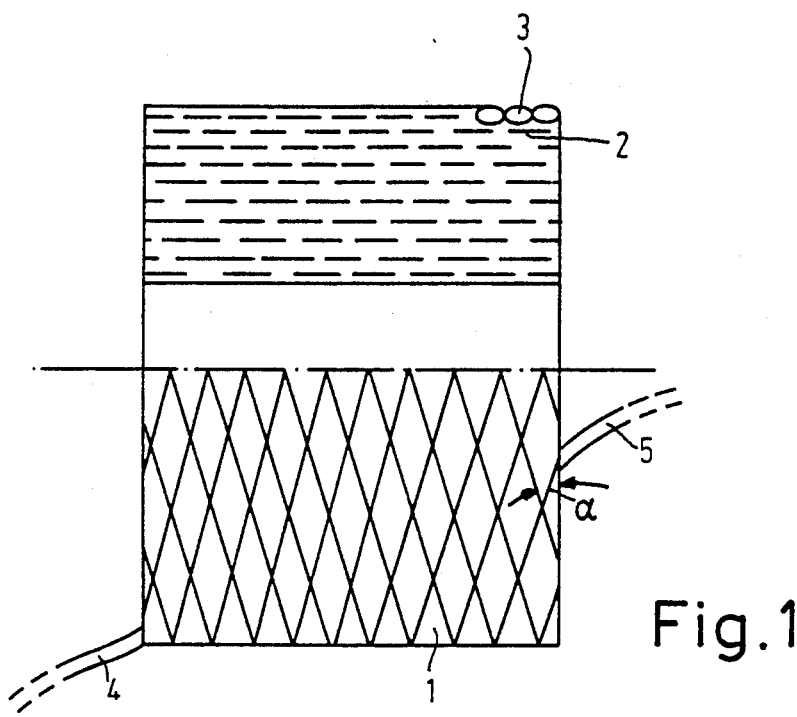
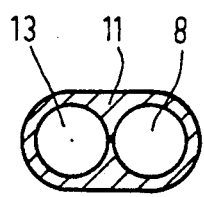 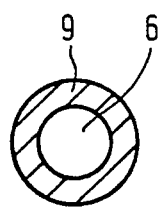 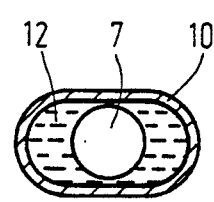
Fig.2  Fig.3  Fig.4

ROLL MANUFACTURED WITH A LIGHT WAVEGUIDE CONDUCTOR

BACKGROUND OF THE INVENTION

The invention relates to a roll manufactured with a light waveguide conductor (LWG-conductor), in particular for the transmission of optical signals from and to, respectively, a moving body.

In an arrangement known form DE-OS 20 12 293 a coil wound with an LWG-conductor is accommodated in a rocket-driven missile. On such coils, a large supply length of the LWG-conductor must be wound with a minimum volume, and it must be possible to unreel said conductor at high speed without loops or knots being formed.

The coil must be wound with extreme care so that an interference-free rapid unreeling process is possible. Neither in the wound condition, nor during unreeling may the optical properties of the LWG-conductor be adversely influenced. For conventionally used LWG's the radius of curvature may not be smaller than approximately 15 mm.

SUMMARY OF THE INVENTION

It is the object of the invention to ensure in a coil of the type mentioned in the opening paragraph a perfect construction of the roll and an interference-free unreeling operation. The additional attenuations resulting from the winding operation of the LWG-conductor must be as small as possible.

This object is achieved in that the LWG-conductor is wound to form a self-supporting cross-roll without a winding core.

In the arrangement according to the invention the LWG-conductor can be unreeled particularly rapidly from the inner layers of the non-rotating roll. The self-supporting cross-roll according to the invention without a winding core is a firm assembly also without a coil former. The cross-roll can be manufactured with a particularly well arranged build-up, when the LWG of the LWG-conductor comprises a sheath which in the bond of the cross-roll, in particular at the cross-points of the turns, has a flattened cross-sectional contour which is widened in the direction of the winding plane.

According to a simple solution it is ensured that the sheath of the LWG-conductor in the starting position has an elongate cross-sectional shape. A widened cross-sectional shape is automatically obtained with an additional element of approximiately the same cross-section, in particular a further LWG, is provided beside the LWG and may then also be used for the data transmission. An additional element could also consist of a particularly tension-proof synthetic resin or of a metal. Advantageously such a material is chosen which has at least approximately the same physical characteristics (E-modulus, temperature behaviour and dimensions) as the LWG.

Bulges of the wider side faces of the LWG-conductor which are directed outwards too considerably can be avoided in that the sheath is extruded with underpressure.

A simple solution is characterised in that the roll is wound with an LWG-conductor whose circular sheath has an E-modulus of smaller than 1 GPa. The originally circular sheath is deformed to the desired flat shape during the winding operation. Suitable for this purpose are materials having a low E-modulus of less than 1 GPa, for example, in particular thermoplastic polyurethane or soft polyvinylchloride.

According to a very advantageous solution it is ensured that the LWG is enveloped by a hose-like sheath with some intermediate space. The desired flat cross-sectional contour is then obtained during the winding operation even when harder materials are used for the sheath. It is to be preferred that a gel-like material should be provided between the hose-like sheath and the LWG. A gel-like mass having the known advantages permits the desired deformation of the hose-like sheath to a flat cross-sectional contour. In contrast with a fixed envelope of the LWG, smaller damping increases are caused by the last-mentioned solution. Comparatively hard materials may be used for the synthetic resin envelope, in particular, for example, polybutylene terephthalate and elastomer-modified polybutylene terephthalate. Polymides have also proved to be advantageous.

It is possible as such to additionally accomodate inside the envelope at least one pull-relief element, in particular in the form of at least one fibre-like element.

An advantageous possiblity of fixing the LWG-conductor in its position in the roll consists in that a metal wire plastically deforming during the winding operation is accomodated additionally inside the sheath.

Securing the position of the LWG-conductors in the roll is further improved in that the coefficient of friction of the sheath exceeds $\mu+ =0.3$. Moreover, the holding forces of polar materials (for example, polyurethane) may contribute to maintaining the shape of the roll.

Particularly small increases in damping of the wound LWG-conductor are obtained in that the inside spacing between two adjacent turns of LWG-conductors is the 1- to 4-fold, preferable the 1- to 2-fold of the average diameter of the LWG-conductor.

It has been found that the angle of inclination $\alpha$ of the LWG-conductor relative to a cross-sectional plane of the cross-roll should, for reasons of stability, be as large as possible, but on the other hand it should be as small as possible to avoid impermissible increases in damping of the LWG-conductor. It is therefore ensured that the angle of inclination $\alpha$ of an LWG-conductor turn relative to a cross-sectional plane of the cross-roll in each winding layer lies in the range from 2° to 30°, preferably in the range from 4° to 10°.

A manufacturing method which is advantageous for this embodiment is characterised in that, depending on the diameter of the cross-roll each time occurring during the winding operation, the angle of inclination $\alpha$ is adjusted as to be in the range from 2° to 30°, preferably in the range from 4° to 10°.

By means of the adjustment of the angle of inclination t is possible to manufacture also coils having a high number of layers while maintaining the above mentioned limits for the angle of inclination $\alpha$. In this manner it is prevented that the angle of inclination $\alpha$ constantly decreases with increasing diameter of the roll so that the roll might become unstable. In the unreeling operation of the LWG-conductor from a non-rotating roll, torsions are formed in the LWG-conductor. It is therefore ensured that the LWG-conductor in the roll is wound with a torsion throughout its length. In manufacturing the roll a counter-compensating torsion is provided. Advantageously, the torsion of the roll is produced with such a small amount that the torsion produced on the LWG-conductor during the unreeling operation is compensated for only partly so that neither the wound, nor the unreeled conductor has too high a torsion.

It has further been found advantageous that the torsion is different in various radial winding layers or areas of winding layers. The angle of torsion per unit of length of the LWG-conductor decreases with increasing diameter of a winding layer.

BRIEF DESCRIPTION OF THE DRAWING

The invention will now be described in greater detail with reference to advantageous embodiments shown in the drawing, in which:

FIG. 1 is a side elevation of a cross-coil according to the invention, cut in two halves;

FIG. 2 is a sectional view of an LWG-conductor which in the initial position has a widened sheath;

FIG. 3 is a cross-sectional view of an LWG-conductor which in the initial position has a circular sheath of a soft synthetic resin;

FIG. 4 shows a cross-sectional shape adjusting in the wound condition of an LWG-conductor eneloped by a gel intermediate layer and a synthetic resin envelope.

DETAILED DESCRIPTION OF THE PREFERRED EMBODIMENT

In the cross-roll shown diagramatically and not to scale in FIG. 1, the lower half shows the variation of the turns which are typical of a cross-roll of an LWG-conductor 1 which are wound with an anle of inclination $\alpha$. In the longitudinal sectional view of the upper half of the broken lines denote winding planes of a multiplicity of winding layers lying radially one over the other. Cross-sectional shapes 3 of the LWG-conductor of the outermost winding layer are shown. The wider cross-sectional sides extend in the diretion of the planes of their winding layer.

When the cross-roll is accomodated in a moving body, the end 4 of the optical conductor 1 is optically coupled to a transmitter and/or receiver of the body. The end 5 is coupled, for example, to a stationary transmitter/receiver unit. The LWG-conductor is unreeled from the interior of the cross-roll in accordance with the speed of the moving body.

Particularly low dampings are obtained when a spacing of the 1-fold to 2-fold of the average conductor diameter is maintained between the two adjacent LWG-conductor turns. Values exceeding the 4-fold of the average conductor diameter do not provide any noteworthy advantage in this respect.

The angle of inclination $\alpha$ of the conductor turns with respect to a cross-sectinal plane of the cross-roll was adjusted in all layers at a value which differed only little from 8°. The ratio of the speed of winding and the speed of the axial guiding of the LWG-conductor was constantly adapted so that the angle $\alpha$ was kept in the range from 4° to 10°. Such adaptation may be done constantly. In the preferred embodiment it was done step-wise after the manufacture of each time a few winding layers, since a certain fluctuation range of the angle of inclination $\alpha$ is allowed.

FIGS. 2, 3 and 4 show on an enlarged scale various cross-sectional shapes of an LWG-conductor with respect to position 3 in FIG. 1. The LWG's 6, 7 and 8, respectively, have a diameter of approximately 250 $\mu$m, the synthetic resin coating included. They are enveloped by extruded sheaths 9, 10 and 11, respectively.

In the embodiment shown in FIG. 2 an element 13 of the same cross-sectional shape is provided in the synthetic resin sheath 11 parallel to the LWG 8. A flattened cross-sectional shape is obtained which facilitates the winding of a similar cross-roll.

This element may be a further LWG by which additional information transmission is possible. However, a glass fibre which is only tension-proof and is not suitable as a waveguide may also be used, as well as other strain relief elements, for example, Kevlar-Roings or also metal wires. Preferably elements should be used the physical characteristics of which (E-modulus, temperature behaviour and dimensions) differ from those of the LWG 8 as little as possible.

A plastically deformable metal wire has proved to be particularly suitable. Said wire maintains the winding layer of the conductor shown in FIG. 2 against the elastic recoil forces of the LWG 8 also at reversal points of the winding inclination, even when the surface of the synthetic resin sheath 11 is comparatively smooth and free of adhesive.

In order that during the extrusion of the sheath the wider side faces thereof do not arch so much outwards, it is advantageous in the embodiment of FIG. 2 to extrude with underpressure. Even inwardly directed arches may then be produced which are favourable for winding the cross-roll.

In the embodiment of an LWG-conductor shown in FIG. 3 the LWG 6 is enveloped only by a particularly soft and not too thin synthetic resin sheath which during winding the cross-roll is deformed to an elongate cross-section similar to FIGS. 2 and 4, so that at least approximately equally good winding results are obtained as in an elongate cross-sectional shape present already originally.

Synthetic resins having an E-modulus of less than 1 GPa have proved to be particularly suitable for the sheath 9. Therefore, in particular thermoplastic polyurethane or soft polyvinyl chloride was used.

Outside diameters of less than 1 mm are to be preferred for the sheath 9. Of course, when the LWG-conductors are too thick, the length of the conductor to be provided in a unit by volume of a cross-roll is small.

In the FIG. 4 embodiment more rigid sheaths 10 may be used, since the flexibility of the cross-sectional shape is achieved by a gel-like intermediate layer 12 which additionally prevents the damping increases of the LWG.

FIG. 4 shows the resulting cross-sectional shape in the cross-roll. Originally, a circular synthetic resin sheath 12 concentrically enveloping the LWG 7 was provided around the said LWG by extrusion.

When the coefficient of friction of the sheath 9 of the sheath 10 exceeds $\mu=0.3$, the cross-roll also coheres readily without a coating of adhesive on the conductors and can be unreeled without disturbances at high speed.

We claim:

1. A roll arrangement for a light waveguide conductor (LWG-conductor) for the transmission of optical signals to and from a moving body, comprising:
   said LWG-conductor being wound in the form of a self-supporting roll having crossed turns without a winding core; and
   a sheath surrounding said LWG-conductor, said sheath having a flattened cross-sectional contour at at least the crossing points of said turns with the wider portion of said contour disposed in the direction of plane of winding.

2. A roll as claimed in claim 1, characterised in that it is wound with an LWG-conductor whose circular sheath comprises an E-modulus of smaller than 1 GPa.

3. A roll as claimed in claim 2, characterised in that the sheath consists of thermoplastic polyurethane or soft polyvinyl chloride.

4. A roll as claimed in claim 1, characterised in that the LWG is enveloped by a hose-like sheath with intermediate space disposed therebetween.

5. A roll as claimed in claim 4, characterised in that a gel-like mass is provided between the hose-like sheath and the LWG.

6. A roll as claimed in claim 4 or 5, characterised in that the hose-like sheath consists of polybutylene terephthalate or elastomer-modified polybutylene terephtalate.

7. A roll as claimed in claim 1, characterised in that in addition at least one strian relief element, in particular in the form of at least one fibre-like element, is provided inside the sheath.

8. A roll as claimed in claim 1, characterised in that in addition a metal wire plastically deforming during the winding operation is provided inside the sheath.

9. A roll as claimed in claim 1, characterised in that the coefficient of friction of the sheath exceeds $\mu = 0.3$.

10. A roll as claimed in claim 1, characterised in that the interior spacing between two adjacent runs of LWG-conductors is in the range of 1 to 2 times the average diameter of the LWG-conductor.

11. A roll as claimed in claim 1, characterised in that the LWG-conductor in the roll is wound with a torsion through its length.

12. A roll as claimed in claim 11, characterised in that the torsion in various radial winding layers or areas of winding layers is different.

13. A roll as claimed in claim 12, characterised in that the angle of inclination $\alpha$ of an LWG-conductor turn relative to a cross-sectional plane of the cross-roll in each winding layer lies in the range from 2° to 30°, preferably in the from 4° to 10°.

14. A method of manufacturing a cross-roll as claimed in claim 13, characterised in that, depending on the diameter of the cross-roll reached each time during the winding operation, the angle of inclination $\alpha$ is adjusted so as to be in the range from 2° to 30°, preferably in the range from 4° to 10°.

* * * * *